United States Patent Office 3,445,098
Patented May 20, 1969

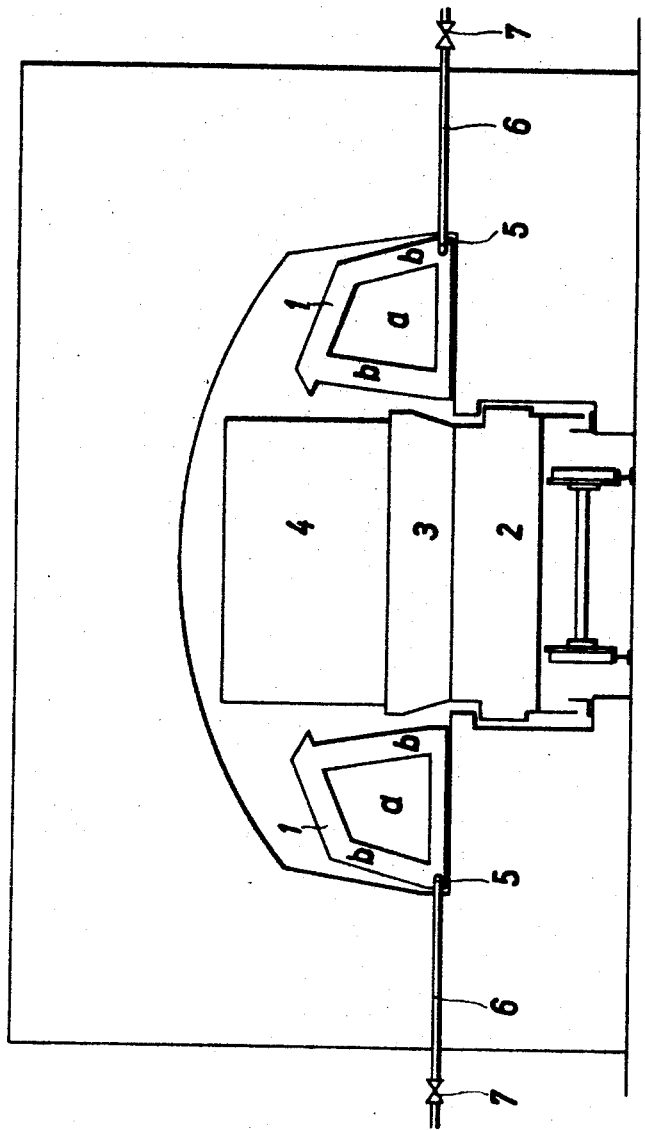

3,445,098
METHOD AND DEVICE FOR IMPROVING THE TEMPERATURE EQUALIZATION OF GASES IN TUNNEL FURNACES AND OVENS
Hans U. Kaether, Dethmerstr. 34, Hildesheim, Germany
Filed Mar. 3, 1967, Ser. No. 620,416
Claims priority, application Germany, Nov. 30, 1966, H 61,150
Int. Cl. F27d *13/00;* F28d *7/10*
U.S. Cl. 263—28                                    10 Claims

ABSTRACT OF THE DISCLOSURE

Uniformity of temperature in the preheating zone of an indirectly heated tunnel furnace or tunnel kiln or oven is obtained by forced circulation of furnace gases around the circulation ducts of the combustion chambers by introducing gas, preferably cold or preheated air, through jet-forming nozzles into the lower circulation duct.

BACKGROUND OF THE INVENTION

*Field of the invention*

This invention relates to a method of and a device for improving the temperature equalization of gases in indirectly fired tunnel furnaces, tunnel kilns or ovens.

*Description of the prior art*

In indirectly fired tunnel furnaces, the heating action is provided by means of combustion chambers situated along the lateral walls, in which a combustion occurs in the firing space of the furnace, and in which the waste gases flow in a preheating space towards the furnace inlet and are drawn off towards the chimney. The material to be fired, which is placed on cars, firing carriages or trolleys and is conveyed through the furnace or oven tunnel, remains separated from the combustion gases, and the heat transfer to the material to be fired occurs primarily by radiation, and to a lesser degree by natural convection in the furnace duct.

In the conventional kinds of furnace, measurements of the temperature distribution in the material to be fired show that considerable temperature differences exist between the upper and lower part of the charge on the firing trolley in the preheating space, and in particular that the upper portion of the material becomes heated before the lower portions.

In the known Dressler combustion chambers, the natural gas flow by convection in the furnace duct is enhanced by the fact that the walls of the combustion chamber are formed in the manner of ventilation ducts so that a transverse circulation of the gases forming the furnace atmosphere results from the furnace atmosphere circulating in the ducts.

Further measures for accomplishing better uniformity of temperature distribution consist of taking care to ensure, by appropriate arrangement of the combustion chamber and the material to be fired in the furnace, that the thermal radiation impinges primarily on the lower portions of the firing trolley or car charge, and thus compensates for the heat absorbed by the upper portions of the material in the preheating space, the said compensation occurring in the firing space.

On the basis of a fixed performance in the high temperature space of the furnace, it is thus possible according to the present state of technology, to obtain a relatively uniform temperature throughout the material being fired. The irregular heating action which occurs in the preheating space, and which is disadvantageous to the quality of the material to be fired, cannot however be eliminated by the measures specified. Because the temperature differences within the charge are inversely proportional to the time taken by the charge to travel through the tunnel, increases in the performance of the furnace are no longer possible without abandoning the uniform temperature distribution in the high temperature space.

It is known that temperature distribution in the preheating space may be improved by circulating blowers. According to this method, gas is drawn off at one or more points from the furnace duct, and is forced in again at another point. The principal disadvantage of this method is that a uniform temperature distribution in the furnace atmosphere and in the material to be fired can be accomplished only in the immediate vicinity of the circulation system. In tunnel furnaces, which generally are very long, a useful improvement can be accomplished only by incorporation of a multiplicity of circulating blowers, which results in a considerable investment in plant. To this must be added that circulating blowers are practically unusable at high temperatures.

It is a main object of the present invention to provide a method and a device, by the use of which there can be obtained a temperature equalization of gases in the preheating space, without the disadvantages which result from the use of circulating blowers.

SUMMARY

According to one aspect of the invention a method of improving the temperature equalization of gases in the preheating zone of an indirectly heated tunnel furnace or oven consists of forcing circulation of the gases of the furnace atmosphere around the combustion or firing chambers of the furnace or oven by introducing jets of a gas into the circulation ducts of the chambers.

According to another aspect of the invention there is provided the combination with the preheating zone of a tunnel furnace or oven of one or more gas infeed jet-forming nozzles situated in the base duct of the combustion chamber and directed towards the tunnel of the furnace.

BRIEF DESCRIPTION OF THE DRAWINGS

The accompanying diagrammatic drawing which illustrates a cross-section through the preheating space of an indirectly heated or fired tunnel furnace or oven comprising Dressler chambers.

DESCRIPTION OF THE PREFERRED EMBODIMENT

Referring to the drawing, the firing or combustion chamber 1 is situated along the two opposite sides of the furnace and the waste gases of combustion flow towards the front of the furnace through the space *a*. Firing cariages or trolleys 2, which are provided with a supporting refractory body 3, convey the material 4 to be fired through the tunnel furnace. A natural circulation normally occurs from bottom towards the top in the circulation ducts *b* of the firing or combustion chambers, which results in transverse circulation of the gaseous atmosphere of the furnace.

If Dressler chambers are employed, it is preferable, in carrying out the method of the invention, to establish distance between the walls of the base duct of a chamber 1 is approximately equal to one-half the distance between the walls of one of the other circulation ducts of the chamber.

According to the invention, the gas flow in the circulation ducts *b* is effectively increased by blowing in of a gas. For example, air under high pressure is blown into the lower, horizontally extending circulation ducts through a nozzle 5 so that with correct dimensioning of the nozzles and appropriate initial pressure, a volume of gas which is a multiple of the volume of impelling gas, is drawn in through the upper and rear circulation duct, and the gas mixture is blown out into the furnace through the lower circulation duct. This increases the transverse circulation of the gaseous atmosphere of the furnace in effective and advantageous manner establishing uniform heating of all portions of the charge of the firing carriages or trolleys. The gas circulation is controlled in the simplest manner by a control element 7 interposed in a gas infeed duct 6. The circulation may be controlled by centrally controlling the initial pressure of the gas introduced through all the jet nozzles, or each nozzle may be controlled separately.

If desired, the arrangement of the jet-forming nozzle or nozzles may be such that the flow in a rear circulation duct b, that is a duct remote from the tunnel of the furnace, occurs upwards, so that the impelling gas travels in the direction of the normal convection flow of the gases around the circulation duct. With this arrangement there may be an additional infeed of gas which is introduced at high velocity into the lower air circulation duct in the direction towards the interior of the furnace.

By appropriate configuration of the furnace space, one can ensure that the gases circulate around the combustion or firing chamber, absorb heat convectively, and release this heat again after being blown into the tunnel.

From the foregoing it will be understood that by the method according to the invention there is effected an advantageous transverse circulation of the gaseous atmosphere of the furnace in the preheating space thus accomplishing uniform heating of all portions of the charge. Further, the natural longitudinal flow phenomena in the tunnel ducts are diminished, and heat dissipation from the hot combustion or firing gases is increased in the preheating space, thus resulting in higher firing efficiency of the furnace or oven.

It will also be understood that by appropriate dimensioning of the combustion chamber and/or metering of the volume of gas introduced, a part of the circulating gas is caused to flow upwards through the front circulation duct of the chamber and circulates in the ducts of the combustion chamber thereby improving the heat transfer from the waste gases to the circulating gas.

The gas circulation primarily influences the temperature distribution across the furnace cross-section. By virtue of the changed heat transfer performance, the waste gas temperature pattern or gradient in the combustion chamber changes. Accordingly, if the output of the furnace is not changed, more heat is transferred in the preheating space, and less in the firing space, and in operation during circulation of the gases the temperatures of the charge on the lower part of the cars being raised. The mean gas temperature in the chamber is thus a little lower in the firing space than without circulation, being a little higher at the end of the preheating space and dropping more abruptly towards the front. Exploitation of the waste gases is better, i.e. fuel requirements are reduced.

Apart from the advantages described, further advantages may be obtained by the use of the invention, for example simplicity of construction, moderate power input, adequate controllability, and moderate investment in plant.

I claim:
1. A method of improving the temperature of equalization of gases and heat transfer in a preheating zone of an indirectly heated tunnel kiln using Dressler chambers, each of which comprises interconnected circulation ducts including a base duct, two spaced substantially vertical side ducts and a top duct, and means in at least one of said ducts for directing at least one jet of an additional gas into said at least one of the circulation ducts, comprising the steps of directing said additional gas jet directly into said at least one duct so that a substantial amount of gas is drawn in from the tunnel chamber in accordance to the injector principle and forced on thereby obtaining a forced circulation of gases in the kiln atmosphere in the circulation ducts of the Dressler chambers and transversely of the longitudinal axis of the tunnel kiln.

2. The method according to claim 1, in which said additional gas is under high pressure and at a selected temperature when introduced into one duct of the Dressler chambers.

3. The method according to claim 2, in which the additional gas is introduced into the duct of the Dressler chambers at a plurality of positions along the length thereof.

4. The method according to claim 1 in which said additional gas is air.

5. The method according to claim 2 in which said additional gas is air.

6. The method according to claim 1 in which the direction in which the additional gas is introduced is substantially against the direction of the normal updraft flow of the gases of the kiln chamber.

7. The method according to claim 2 in which the direction in which the additional gas is introduced is substantially against the direction of the normal updraft flow of the gases of the kiln chamber.

8. The method according to claim 1 in which the flow of said additional gas is controlled.

9. In combination with the preheating zone of an indirectly heated tunnel kiln having Dressler chambers, each of which comprises a base duct, two spaced substantially vertical side ducts and a top duct, all of said ducts being in communication, at least one jet forming nozzle mounted in the base duct of the Dressler chamber and directed towards the inner chamber of the tunnel kiln.

10. The combination according to claim 9 in which said jet forming nozzle is directed upwardly into the outer vertical circulation duct of the Dressler chamber.

References Cited

UNITED STATES PATENTS 1,646,208  10/1927  Meehan.
3,168,298  2/1965  Cook et al. _____ 263—28

FOREIGN PATENTS 525,332  1/1954  Belgium.

JOHN J. CAMBY, *Primary Examiner.*